July 21, 1953 Y. PONSAR 2,646,060
APPARATUS FOR AUTOMATICALLY REGULATING THE FLOW OF FLUIDS
Filed June 2, 1947 3 Sheets-Sheet 2
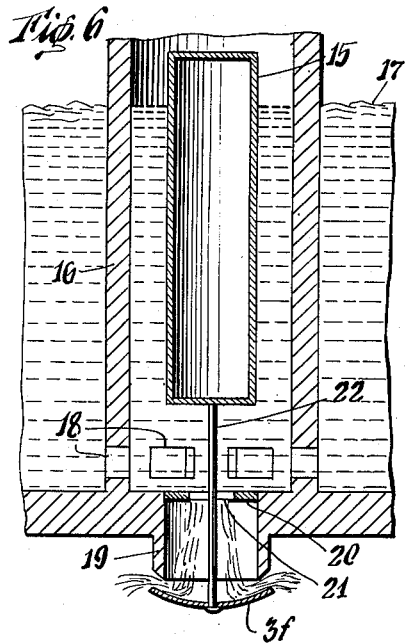
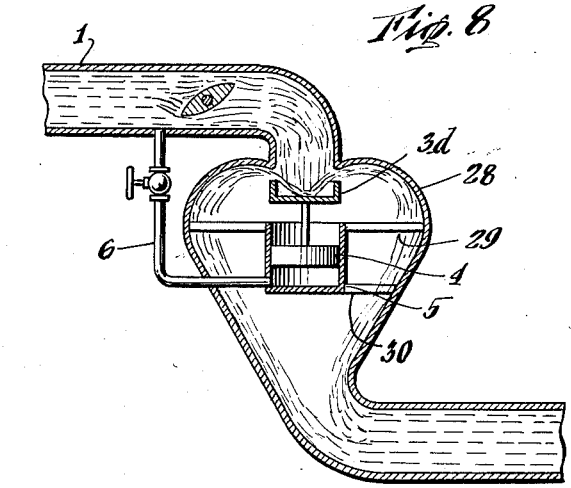
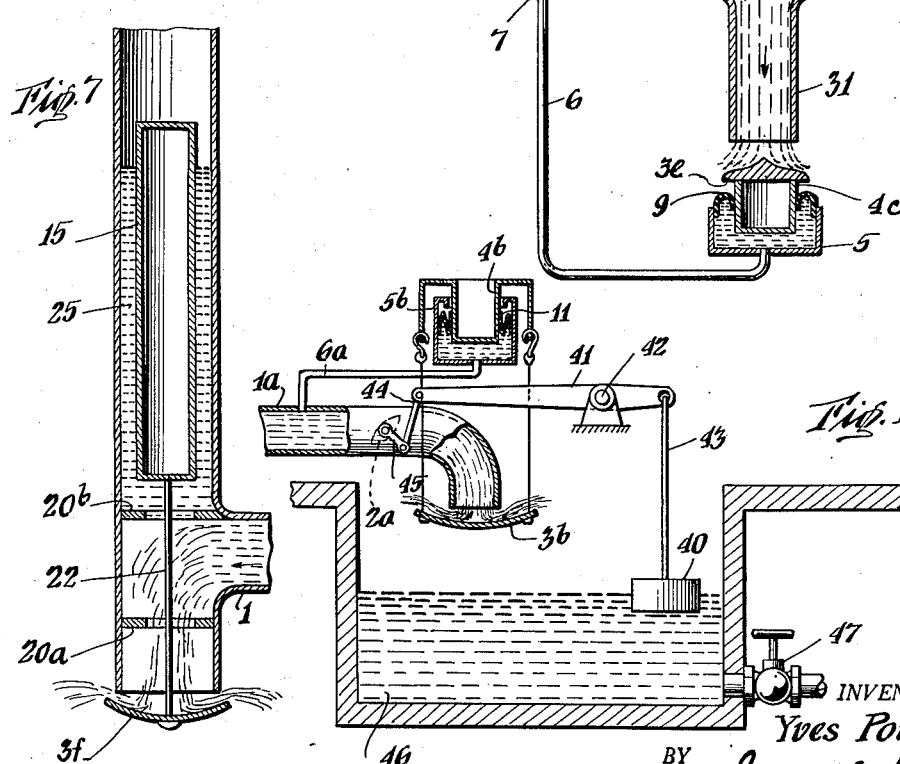
INVENTOR.
Yves Ponsar
BY George H. Cooley
ATTORNEY INVENTOR.
Yves Ponsar
BY George H. Georey
ATTORNEY Patented July 21, 1953

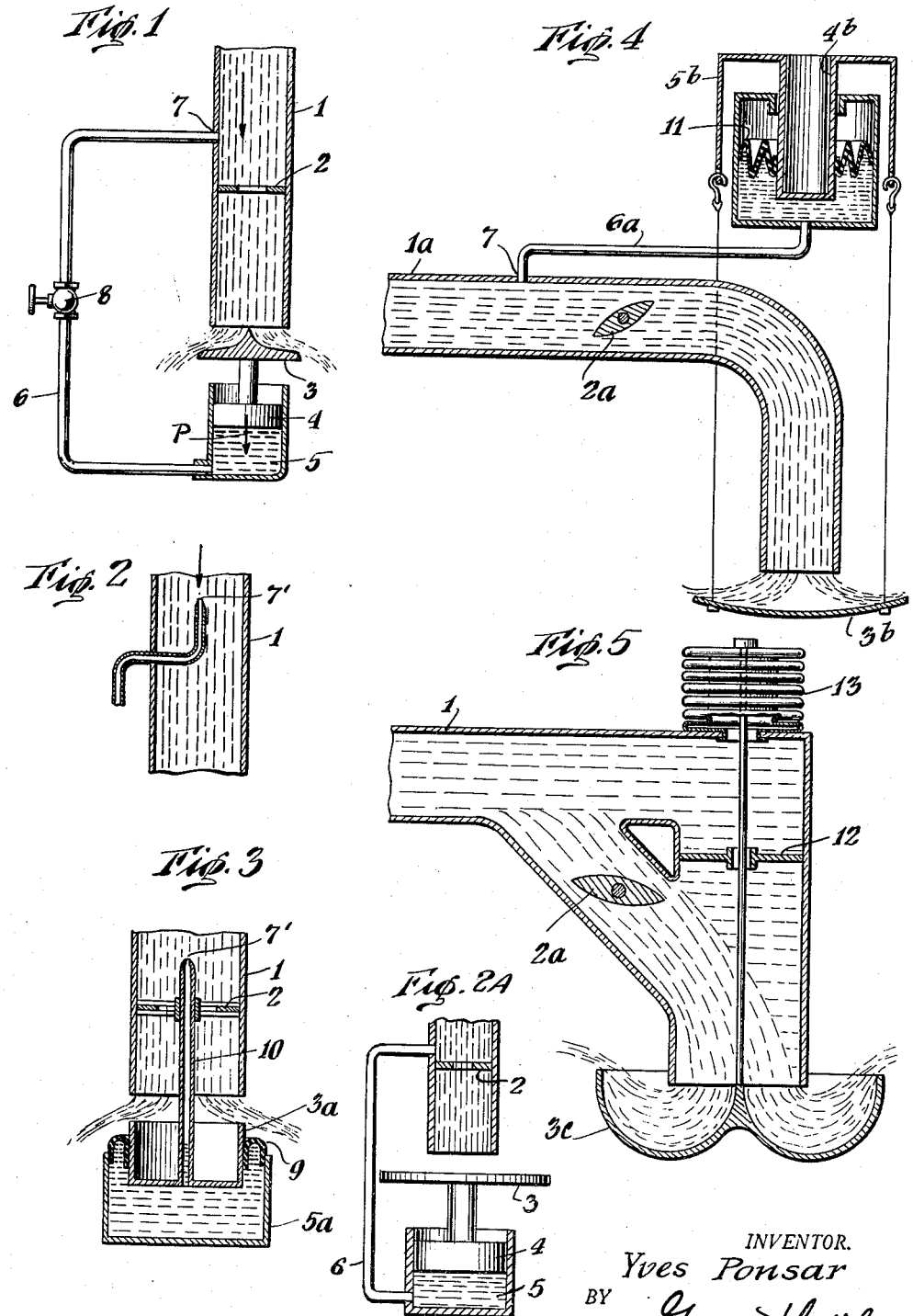

2,646,060

UNITED STATES PATENT OFFICE 2,646,060

APPARATUS FOR AUTOMATICALLY REGULATING THE FLOW OF FLUIDS

Yves Ponsar, Grenoble, France, assignor to Ateliers Neyret-Beylier & Piccard-Pictet, Grenoble, France, a corporation of the French Republic Application June 2, 1947, Serial No. 751,667
In France June 4, 1946

17 Claims. (Cl. 137—117)

The present invention relates to apparatus for regulating the flow of fluid through a conduit so as to produce a volumetric rate of flow which is regulated in a manner independent of any variations in the total head at the conduit inlet. While the invention has particular application to irrigation and filtration systems, it can be used in many other situations, for example, in the chemical industries, where it is often desired to control the flow of various liquids or gases with a view to maintaining either a constant or other regulated discharge.

There are many well-known systems for regulating fluid flow, including some which, like the present invention, utilize the pressure drop created in a conduit by a restriction therein. In such known systems, the pressures above and below the restriction are applied to a differential pressure responsive member which operates a balanced valve in the conduit. (A balanced valve may be defined as one unaffected by differences in pressure between its inlet and outlet.) The differential pressure responsive member is also subject to a substantially constant biasing force, which may be the force of gravity, and which opposes the differential pressure. Consequently, the system can be in equilibrium only when the pressure drop across the restriction is constant, and hence when the rate of flow is constant. If the pressure drop varies, the differential pressure responsive member displaces the valve in a sense to restore the rate of flow, and hence the pressure drop, to its original value.

In such a system, substantially perfect balancing of the valve is essential, since without it, the changes in the force acting on the valve would disturb the equilibrium relationship between the biasing force and the pressure drop through the restriction; and, for a given pressure drop, different flows would be obtained with different valve positions.

In contrast to such prior flow regulating systems, the present invention employs, instead of a balanced valve, an obturator in the path of a jet so that the obturator is subjected to the total head of the flowing fluid. This obturator is of much simpler construction than the balanced valves of the prior art.

A flow regulator constructed in accordance with the present invention comprises the following essentials:

(1) An obturator aligned with the outlet of a conduit and supported for movement along a path parallel to the direction of flow of the jet from the conduit, which jet impinges on the obturator and tends to displace it in the direction of flow.

(2) A restriction in the conduit spaced a short distance upstream from the outlet.

(3) A pressure sensitive element operatively connected to the obturator for movement concurrently therewith, and means subjecting said element to a pressure within the conduit on the upstream side of the restriction, the connection between the obturator and the pressure sensitive element being such that the pressure in question tends to move the obturator in opposition to the thrust of the jet. This pressure may be either the static pressure or the total pressure, as long as its reflects variations in the static head (if the velocity remains constant).

(4) In a system including the three elements just described, the thrust of the jet on the obturator may be considered as consisting of two components, one varying with the static head, the other with the velocity head. For purposes of analysis, it is convenient to group the static head thrust component with the opposing static head force acting on the pressure sensitive element, and consider the difference of these two forces, which difference acts on the obturator in a flow decreasing direction and which varies with the loss of static head across the restriction. That loss of head increases with increasing velocity at a rate determined by the dimensions of the restriction. Opposing this difference of forces, hereinafter termed the static head differential, there are two forces acting in a flow increasing direction on the obturator: one of these is the second component of the jet thrust mentioned above, which increases with increasing velocity at a rate determined by the contour of the obturator; the other is a constant or substantially constant auxiliary biasing force, which may be the weight of the obturator and its associated parts, or may be the force of a biasing spring. A fourth essential characteristic of the invention is that the dimensions of the restrictions are selected with regard to the obturator contour so that the variable flow decreasing force or static head differential, increases at a faster rate with increasing velocity than does the sum of the flow increasing forces. If this characteristic is present, then at some velocity, the flow decreasing force will just balance the sum of the flow increasing forces. This characteristic is explained more fully below.

The rate of flow may be varied in a regulator constructed in accordance with the present invention either by varying the auxiliary force, or by varying the area of the restriction, for example, by means of a valve, or by varying both of those factors.

An apparatus according to this invention operates equally well whether it be submerged or in the free air and it may be inserted into a closed distributing system.

Different types of obturators may be used conformably to the invention.

For a better understanding of the invention, reference will be made to the following description and the drawings hereto attached, which are given by way of example and not by way of limitation.

In the drawings:

Fig. 1 is a vertical sectional view, illustrating an embodiment of the invention in which the pressure sensitive element is subject to the static pressure of the fluid upstream from the restriction.

Fig. 2 is a vertical sectional view, illustrating a modified form of the apparatus of Fig. 1, in which the pressure sensitive element is subject to the total pressure.

Fig. 2A is a vertical sectional view of a modification, illustrating a different form of obturator.

Fig. 3 is a vertical sectional view of a modified form of the apparatus of Fig. 2, employing a different obturator contour and a different form of pressure sensitive element.

Fig. 4 is a vertical sectional view of a further modification, including a different form of obturator and a different pressure sensitive element.

Fig. 5 is a vertical sectional view of still another modification embodying another pressure sensitive element.

Figs. 6 and 7 show vertical sectional views of still further modifications in which the obturator is operated by a float acting as a pressure sensitive element.

Fig. 8 is a vertical sectional view of still another embodiment of the invention, differing from the embodiments previously illustrated in that apparatus is located completely inside a closed conduit.

Fig. 9 is a vertical sectional view of still another embodiment of the invention wherein the flow regulator is introduced in one of two branches of a main conduit and controls the total flow through the main conduit.

Fig. 10 is a part vertical section and part side elevation of apparatus constructed in accordance with the invention to control the liquid level in a tank into which the jet discharges.

Figure 11:
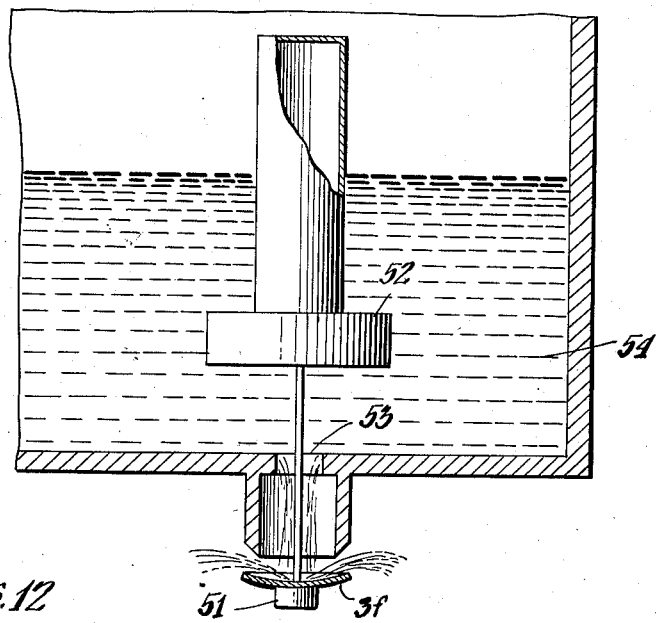
Figs. 11 and 12 are both part vertical sections and part side elevations of still further modifications employing a float as a pressure sensitive element.

As used in this specification, the term "total head" is intended to refer to the sum of the static head and the velocity head, unless stated otherwise. The potential head, which is a measure of the difference in elevation between a point under consideration and an arbitrary datum, will be disregarded for most of the modifications shown. It is assumed that all points under consideration are sufficiently close together so that their differences in elevation are small as compared to the static heads involved, so that their potential heads may be neglected.

The apparatus illustrated in Fig. 1 includes a conduit 1 in which an annular diaphragm 2 serves as a restriction to produce a loss of static head, or static head differential. An obturator 3 is subjected to the thrust of the jet of fluid which is discharged from the downwardly directed outlet of conduit 1. The obturator 3 is attached to a piston 4, which in turn is slidable vertically within a cylinder 5. The lower end of the cylinder 5 is connected by means of a pipe 6 to a static pressure intake 7 in the conduit 1 on the upstream side of the flow-restricting diaphragm 2. A valve 8 is interposed in pipe 6.

The movable assembly including the piston 4 and the obturator 3 is subjected to a downward biasing force P which may be simply the weight of these elements.

The static head upstream from the restriction 2 is communicated through pipe 6 to cylinder 5, where it produces a force acting upwardly, in a closing or flow decreasing direction on the piston 4 and the obturator 3. The obturator 3 is also subject to the thrust or force of the jet, which sets in a downward or flow increasing direction.

The thrust or force of the jet on the obturator may be considered as consisting of two components, one proportional to the static head at the conduit outlet (which may be assumed, without substantial error, to be the same as the static head in the conduit on the downstream side of restriction 2), and the other varying as a function of the velocity head.

The functional relation between the second thrust component and the velocity head varies with the contour of the obturator. The applicant has found that, with an obturator contoured as shown in Fig. 1, this component may be considered as being substantially equal to a force due to the velocity head acting over the entire cross-sectional area of the jet.

The forces acting on the assembly which includes the obturator 3 and the piston 4 may be grouped for purposes of analysis as:

(a) A force due to the static head differential (or drop in static head across the restriction 2), which acts in a flow decreasing direction. This force is proportional to the velocity head, the particular ratio of proportionality being determined only by the dimensions of the conduit and of the restriction. This force takes into account the pressure on the pressure sensitive element and the opposing static head component of the jet thrust.

(b) The velocity head component of the jet thrust, whose variation with the velocity head is determined principally by the obturator contour, and which acts in a flow increasing direction.

(c) A force due to the weight of the movable parts (or to a biasing spring), hereinafter termed the auxiliary force, also acting in a flow increasing direction.

Since the forces (a) and (b) are different functions of the velocity head, each determined by different variable factors and so completely independent of each other, it may be see that with any given obturator, the dimensions of the restriction may be chosen so that the force (a) increases at a greater rate with variations in velocity head than does the force (b).

The allowable range of variation of the dimensions of the restriction for a given obturator, in order to produce the desired variation of the force (a) with velocity head may be determined from the following mathematical analysis:

Let us assume that:

H is the total head upstream from restriction 2;
V is the average velocity of flow in conduit 1;
S is the cross-sectional area of the outlet of conduit 1;

$S'$ is the cross-sectional area of the piston 4;
$K$ is the ratio of the static head differential at 2 to the velocity head $V^2/2g$;
$\omega$ is the specific gravity of the fluid;
$g$ is the acceleration due to gravity; and
$F$ is the thrust or force of the jet acting on the obturator.

When the obturator and piston are in equilibrium the downward forces are equal to the upward forces. Equating the downward and upward forces, we have:

$$F+P=\left(H-\frac{V^2}{2g}\right)S' \qquad (1)$$

The upward pressure on the piston is $$\left(H-\frac{V^2}{2g}\right)$$

because of the use of static pressure connection.
Equation 1 may be rewritten:

$$F=H\omega S'-\frac{V^2\omega S'}{2g}-P \qquad (2)$$

The thrust of a jet acting on an obturator is a function of the total head, the nature of that function being determined by the contour and dimensions of the obturator.

It has been found by experiment that if the obturator diameter is between 1.2 and 1.3 times the diameter of the conduit outlet, then $$F=-\frac{\omega S K V^2}{2g}+\omega S H \qquad (3)$$

The obturator 3 of Fig. 1 has a diameter within this range. A flat plate of the same diameter would produce practically the same effect, but the pointed and streamlined surface of obturator 3 improves the discharge coefficient of the obturator.

If the area $S'$ of piston 4 is made equal to the area $S$ of the outlet, and if obturator is of the type shown in Fig. 1, then the velocity of flow is fixed at a value which may be determined by equating the right-hand sides of Equations 3 and 2. We thus find that:

$$V=\sqrt{\frac{2gP}{\omega S(K-1)}} \qquad (4)$$

Hence the rate of flow, $Q$, is constant and equal to the velocity times the cross-sectional area of the outlet, $S$.

$$Q=SV=\sqrt{\frac{2gPS}{\omega(K-1)}} \qquad (5)$$

Equation 5 illustrates that one further condition of constant flow is that $K$ must be greater than 1. In other words, the loss of head at restriction 2 must be at least equal to $V^2/2g$.

The foregoing analysis determines the range of variation of the ratio $K$ within which the apparatus of Fig. 1 will reach a state of balance or equilibrium at some value of velocity $V_0$. Let us now consider the operation of the apparatus of Fig. 1, when the diameter of restriction 2 has been chosen so as to give a value of $K$ within the required range, and with a given auxiliary force $P_0$.

The rate of increase of the impact force with increasing velocity is determined by the form and other characteristics of the obturator. The rate of increase of the static head differential with increasing velocity is determined by the ratio $K$. When the obturator is closed against the conduit outlet, the velocity is zero, the static head differential is zero and the impact force is zero so that the only force acting is $P_0$, which acts in a flow increasing direction. It therefore starts the obturator opening, increasing the velocity. As the velocity increases from zero, the static head differential increases faster than the impact force and eventually becomes great enough to balance the sub of the impact force and the auxiliary force $P$. This occurs at some velocity $V_0$. At all velocities below $V_0$, the sum of the impact force and the auxiliary force $P_0$ is greater than the static head differential and the obturator is moved toward open position (velocity increasing direction). If the velocity should continue to increase above $V_0$, the static head differential becomes greater than the sum of the impact force and the auxiliary force $P_0$. When the velocity is greater than $V_0$, the static head differential is greater than the sum of the auxiliary force and the impact force, and is then effective to move the obturator in a closing (velocity decreasing) direction. A condition of stable equilibrium is thus established when the velocity is $V_0$, in which condition any change in velocity causes the movement of the obturator in a direction to vary the flow so as to restore the condition of equilibrium, thereby returning the velocity to its value $V_0$ and maintaining a constant rate of flow past the obturator.

It is apparent that any increase in the static head in the conduit 1 upstream from the restriction 2 will appear in the cylinder 5 and will also be reflected in an equal increase in the static head downstream from the restriction 2, if the velocity remains unchanged. Consequently, any such change in the static head will not affect the static head differential acting on the obturator, so that it will not affect the equilibrium of the obturator or the rate of flow. Such an increase in the static head may produce a momentary change in the stream velocity which would instantaneously affect the equilibrium of the obturator. This change in velocity would be removed by the response of the obturator, as described above.

Fig. 2 illustrates an arrangement including a dynamic pressure connection 7' in place of the static pressure connection 7 of Fig. 1. Where a dynamic pressure connection is used, Equation 1 becomes $$F+P=H\omega S' \qquad (1a)$$

Equation 2 becomes $$F=H\omega S'-P \qquad (2a)$$

and Equation 5 becomes $$Q=\sqrt{\frac{2gPS}{\omega K}} \qquad (5a)$$

From Equation 5a, it is apparent that when a dynamic pressure connection is used, the range of variation of $K$ is changed. The only limitation of $K$ then is that it must be greater than zero.

Considering the modification of Fig. 2 from a non-mathematical point of view, it may be seen that in Fig. 2 there is an additional force component acting in a flow decreasing direction which varies with the velocity head in such a manner as to substantially balance the impact force due to the same velocity head acting downward on the obturator 3. Consequently, variations in the velocity head can have no direct effect upon the equilibrium of the obturator. The only forces affecting that equilibrium are the constant auxiliary force $P_0$ and the static head differential, which varies with the velocity head in a manner determined by the ratio K. A state of equilibrium is then attained at a value of velocity at which the static head differential acting on the obturator assembly balances the auxiliary force $P_0$. It may be seen that such a condition of equilibrium will be attained at some value of velocity as long as the ratio K is greater than zero.

It is also possible to use as an obturator a flat plate having a diameter considerably greater than that of the jet, as shown at 3e in Fig. 2A for example. The diameter of this obturator 3e may be two or three times that of the jet.

In this case, the total thrust F is equal to the sum of a first component due to the inertia of the jet and equal to its mass times its velocity and a second component equal to the weight of the jet, which may be considered as the static head at the conduit outlet times the jet area times the density. This may be expressed as:

$$F=\frac{\omega}{g}SV^2+\omega S\left(H-\frac{V^2}{2g}-\frac{KV^2}{2g}\right) \qquad (6)$$

which may be written as:

$$F=\omega S\left(H+(1-K)\frac{V^2}{2g}\right) \qquad (7)$$

Equation 2 still applies, and by equating the right hand sides of Equations 2 and 7 and making $S=S'$, the rate of discharge is determined to be constant with the value:

$$Q=\sqrt{\frac{2gPS}{\omega(K-2)}} \qquad (8)$$

The condition of stable equilibrium is here K>2, that is to say, the loss of head due to the diaphragm must be at least equal to $$\frac{2V^2}{2g}$$

In the case of a dynamic connection, we would have:

$$Q=\sqrt{\frac{2gPS}{\omega(K-1)}} \qquad (9)$$

The new condition of stable equilibrium is then K>1 as in the case of the obturator of Fig. 1 with a static pressure connection.

Another form of obturator suitable for use in carrying out the present invention is shown in Fig. 3. Those elements of Fig. 3 which are the counterparts of corresponding elements in Fig. 1 have been given the same reference characters and will not be further described. The apparatus of Fig. 3 includes an obturator 3a in the form of a cylindrical cup, open at its upper end, and maintained centrally aligned with an outer cylinder 5a by a flexible collar 9 which also establishes a fluidtight seal between the cup and the outer cylinder. The pipe connection 6 of Fig. 1 is replaced by a cylindrical tube 10 aligned with the vertical axis of the obturator 3a. This tube is open at its upper end and receives the total head at the upstream side of diaphragm 2 and transmits it to the cylinder through the bottom of the cylindrical cup. It is a dynamic pressure connection.

The pressure under the flexible collar 9 exerts an upward force thereon. The effective area of obturator 3a is thereby increased, insofar as its response to the pressure in cylinder 5a is concerned, by an amount less than the full width of membrane 9. In constructing a device of the type shown in Fig. 3, this increase in the effective area of the piston must be considered in determining the size of piston to be used.

An alternative arrangement is to allow piston 3a to slide freely through the diaphragm 9. In that event, there will be substantially no force transmitted from diaphragm 9 to piston 3a, so that only the area of the piston need be considered.

In the cylindrical cup obturator 3a, there is a point of zero downward velocity at the centre, a zone of zero velocity along the bottom. Consequently, the force exerted by the jet is practically proportional to the total head, i. e., the static head plus the velocity head:

$$F=\omega S\left(H-\frac{KV^2}{2g}\right) \qquad (10)$$

This is the same as Equation 3 and the rate of discharge is therefore constant if the cross-section S of the jet is made equal to the effective section S' of the piston.

Under these conditions with a dynamic connection we have:

$$Q=SV=\sqrt{\frac{2g.PS}{\omega K}} \qquad (11)$$

which is the same as Equation 5a, so that K>0 exactly as with the obturator of Fig. 1 when a dynamic pressure connection is used as in Fig. 2.

With a static pressure connection the discharge would be:

$$Q=SV=\sqrt{\frac{2g.PS}{\omega(K-1)}} \text{ with } K>1$$

The device of Fig. 3 may very easily be made into a static connection type by piercing a hole on one side of the tube as in a Pitot pressure tube and, of course, closing the top end of the tube. The hole would, of course, be located above the diaphragm 2.

Fig. 4 shows an obturator 3b having the approximate shape of an inverted spherical cap or dish which is similar in function to the large flat plate previously mentioned. In other words, the obturator 3b has a diameter two or three times that of the jet, and the thrust exerted on it varies with the jet velocity in the same manner as stated above for the case of the flat plate having a similar diameter. Referring to Fig. 4, the portion 1a of the conduit is provided with a butterfly valve 2a which produces the necessary loss of head. The obturator 3b having the spherical dish form is suspended from the piston 4b which is movable in the cylinder 5b. The cylinder is connected by the tube 6a to conduit 1a at 7 and hence on the upstream side of 2, thus forming a static pressure connection.

The obturator 3b has the advantage that it is self-centering in the jet without requiring any guiding, provided its radius of curvature is less than that of the radius of suspension. The piston 4b is not in direct contact with the cylinder 5b, but is attached to it by a flexible membrane 11 having the form of a "glove finger" which can be turned inside out and which assures a perfect tightness between piston and cylinder. Thus friction is reduced to a minimum. The piston is self-centering due to the elasticity of the membrane and to the hydraulic self-centering of the obturator. Since the pressure under membrane 11 exerts an upward force thereon, the effective area of piston 4b is thereby increased by an amount less than the full width of the membrane 11. In constructing a device of the type shown in Fig. 4, the effective area of the piston 4b, which is its actual area enlarged to include the effect of membrane 11, is the area which must be made equal to the cross-sectional area of the conduit.

If we employ a plate having a diameter between 1.2 and 1.3 times the jet diameter as in Fig. 1 and in combination with a dynamic pressure attachment, we have seen that it is sufficient that the loss of head has a value different from zero in order that the device shall function. A very slight loss of head, as for example that produced by the elbow, may suffice. This obviously simplifies the construction of the apparatus, but in this case the loss would not be adjustable. Under such conditions, the obturator would be in equilibrium only at a very high velocity and at a correspondingly high rate of flow.

Fig. 5 illustrates a modification of the apparatus of Fig. 4. It will be seen from the drawing that the pipe system has the form of a bypass in an elbow which permits the location of the piston or a bellows 13 directly above the obturator 3c, which can be attached to the bellows 13 by a simple rod passing through a diaphragm 12 with a central opening having a diameter slightly larger than the rod thus avoiding friction and at the same time minimizing flow through the opening. As in the case of Fig. 4, the loss of head is produced by a butterfly valve 2a.

In any of the regulators described herein which employ a piston, the piston may be attached to the cylinder by a flexible membrane in the form of a glove finger, as in the apparatus of Fig. 4. The piston may alternatively be replaced, as in Fig. 5, by a deformable envelope or metallic bellows 13 of the same type as those employed in certain manometers. Such a bellows has the advantage of doing away with friction while rendering the apparatus perfectly fluid-tight. This apparatus will then act with a certain variation of flow with variations in head since the bellows behaves like a spring. Hence the auxiliary biasing force P in the preceding equation varies with the expansion and contraction of the bellows. However, in installations where such variation is objectionable, its effect may be overcome or nullified by introducing a compensating device to nullify its effects. A deformable envelope of this type is evidently applicable to a great number of the types of apparatus embodying the invention.

According to another form of the invention, as shown, for example, in Fig. 6, a force proportional to the upstream static head upstream from the restriction may be produced by means of a float 15 located, for instance, in a well wherein the level is allowed to rise up to the upstream level. The float should have a height which is greater than the amplitude of the level variations so that it will be subjected to a buoyancy thrust proportional to the height of the liquid. Moreover, as its immersion varies with the downward thrust of the liquid on the obturator, that is to say, with the discharge, the apparatus controls the discharge with a decrement whose value is proportional to the displacement of the obturator divided by the head.

The difference in potential head between the obturator and the bottom of the float is a substantial fraction of the static head, and may not be neglected. However, this difference in potential head is constant for all obturator positions and for all flow conditions as long as the upstream level is above the bottom of the float. Therefore, it may be taken into account as a part of the constant downward force P and does not vary the operation of the apparatus in any way.

This arrangement, as shown in Fig. 6, is particularly applicable to systems of canals having a free surface from which one desires to draw off a constant discharge. As shown, a built-in well 16 has been installed in the bank of a canal 17. The well 16 communicates with the canal through the openings 18 and has in the bottom an opening 19 equipped with a diaphragm 20 having a central orifice 21. The obturator 3f is attached to the float 15 by a rod 22. The apparatus should be so dimensioned that the displacement of the obturator should be small with respect to the variations in level. As shown in the drawing, the diameter of the obturator corresponds to that shown in Fig. 1, namely, 1.2 to 1.3 times the diameter of the jet. Consequently, the thrust force acting on this obturator varies in the same manner with head and velocity, as was set forth above for the obturator of Fig. 1 and for a flat plate of the same diameter.

This type of flow regulator may also be applied to a conduit, as shown in Fig. 7. In such a case there is provided a chamber 25 above the discharge orifice where the liquid level may rise to the upstream level as shown in Fig. 7, the float 15 extending upwardly in the chamber 25 to a height above the maximum upstream level.

It will be observed that the apparatus of Figs. 6 and 7 are very simple and do not require guiding means. As a result of the self-centering of the spherical dish 3f, friction arising from rubbing of the rod 22 against the side walls of the orifice in the diaphragm 20a is avoided. Moreover, by appropriately dimensioning the chamber 25 and furnishing the base of this chamber with an appropriately apertured diaphragm 20b, this chamber is made to act as a surge tank which has the effect of deadening the water-hammer blows which may be produced in the course of regulation or adjustment of the apparatus.

All apparatus made in accordance with this invention may be submerged and discharged under a given head. In this case the obturator is subjected to a downstream pressure, but since the pressure acting on the piston is increased by the same amount, the regulated discharge is not altered, the apparatus behaving as if the head $H$ had become $H'=H-h'$, $h'$ being the downstream head.

Furthermore, an apparatus made in accordance with this invention, may be introduced directly within a conduit system. This is represented schematically in Fig. 8.

The conduit 1 is shown as connected to an enlarged conical casing 28 which at its opposite end is joined to a continuation of the conduit. The casing 28 leads the annular jet around the piston-cylinder elements 4, 5, and collects it together again to direct it to the downstream portion of the conduit. The cylinder 5 is supported in the casing by frame members 29 and 30, one of which may enclose the static pressure connecting tube 6. The piston 4 is connected to the obturator 3d, which is of the cylindrical cup type of Fig. 3. The upper side of the piston 4, as shown, should be in communication with the space beneath the obturator so that it is exposed to the same pressure as the under side of the obturator.

This construction has the advantage that the apparatus may be located in the most convenient place. It may thus regulate at a constant value the discharge of a conduit system independently of variations in the pressure either up or downstream from the regulator. However, the total head loss is relatively great with this construction.

An apparatus constructed in accordance with the present invention may be connected in a branch conduit in such a manner as to maintain a constant flow in a main conduit supplying that branch conduit. Fig. 9 shows such an arrangement somewhat diagrammatically. As shown, the main pipe is provided with a branch take-off 31 intermediate a valve 2a and a second valve 32. A piston 4c carrying an obturator 3 fits within and is sealed to the cylinder 5 by means of the flexible connection 9. A pressure connection between the cylinder 5 and the main pipe 1 is made at 7 at the upstream side of the valve 2a which produces a loss of head.

If the obturator has a form such that the thrust acting on it follows Equation 3 or Equation 10, i. e., if the thrust is proportional to the total head at the outlet, and if the valve 2a remains in a fixed position, then the total discharge through the main pipe past the valve 2a will remain constant regardless of variations in the upstream head.

As a matter of fact, if V is the mean velocity in the main pipe, we have exactly the same Equation 5 for equilibrium as in the case of the obturator of Fig. 1 discussed above. Hence the rate of discharge Q is determined by the ratio K, the force P, and the jet area S. Therefore the total discharge is constant regardless of the respective values of the discharge in the two branches. The obturator of Fig. 9 operates in the same manner as that of Fig. 1, i. e., to establish a constant pressure differential across restriction 2a and hence a constant rate of flow through that restriction. We may regulate the total discharge to any desired value by acting on the valve 2a, which has the effect of modifying the coefficient K which determines the loss of head. By acting on the valve 32 the division of the flow between the two outlets may be changed, but not the total discharge.

Within the limits of the utilization of all these various forms of apparatus the losses of head are very small. Furthermore, the butterfly valve 2a (Figs. 4, 5, 8 and 9) runs no risk of being spoiled due to wear caused by cavitation. In fact, the opening of the obturator is limited in such a manner (not shown) that the major part of the head is used up at that point. The most exposed part is therefore the obturator which has a very simple form and is readily replaced.

It is apparent that the obturator cannot move away from the jet so far that it no longer effectively restricts the flow, or the apparatus could not regulate the flow. While the point where effective restrictive action ceases is the theoretical limit of obturator movement, it must, as a practical matter, have its range of travel considerably more restricted, as indicated in the preceding paragraph. Where the opening movement of the obturator is so limited, it has been found that, even though the jet is not directed downward, the force of gravity acting laterally on the jet is not effective to divert the flow substantially or to affect the thrust force acting on the jet.

The butterfly valve 2a is normally near complete opening. However, it will ordinarily be so installed that it may be completely closed and thereby serve as a shut-off valve for the apparatus when it is desired to replace the obturator or make other repairs or adjustments. The butterfly valve 2a is preferably so constructed that even when it is fully open, it restricts the flow sufficiently to maintain K above its minimum value. If the valve 2a is not so constructed, it must be provided with a stop to limit its opening movement so as to properly limit the range of variation of K.

According to the invention, in order to have a constant discharge in all types of apparatus it is necessary that the auxiliary force be constant. That is why by preference a weight is used. This weight is advantageously that of the mobile element itself to which we may add or subtract a part of its weight for adjustment purposes. We may also transmit the additional weights by mechanical means such as levers, pulleys, cables, etc.

For example, a weighing scale beam exerting a force on the mobile part of the equipment through the intermediary of knife edges may be employed. By displacing a movable weight along such a beam the desired adjustment of the fluid discharge may be effected. If desired a scale graduated to read directly in discharge values may also be provided.

If we regulate the discharge by means of a weight or other rigorously constant force the apparatus functions without any decrement, that is to say, for a given variation H, in the total head, the variation Q in the corresponding discharge is zero. However, the operation remains stable. But for the convenience of facilitating certain applications it is possible, according to the invention, to admit a certain decrement Q/H, even when $S=S'$, by utilizing as auxiliary force a slightly variable force like that of a metallic spring or other elastic material, or even a compressed air spring.

The valve producing a loss of head may be acted on in a similar manner following any desired law. This valve may likewise be graduated to read in discharge values. Also, according to this invention, use may be made of two methods of regulation jointly, thereby further extending the field of application of the invention.

Where but a single one of these two methods of regulation is employed, the discharge may be recorded by connecting the regulating device to a registering instrument combined with a clock movement. This arrangement may also indicate the quantity of water discharged.

In the case where the two methods of control are used simultaneously, the measuring scales are not constant. By taking into account and modifying one of the scales by the other control device it is still possible to record the discharge and the quantities of water which have passed. For instance, for each position of the movable weight of the scale beam a corresponding position may be provided on a registering tape. By acting on the valve or on the weights and using as a function another scale value, the discharge may be conformed to this scale following the desired law.

This is the case of Fig. 10 where an apparatus similar to that of Fig. 4 is shown as modified and adapted to a reservoir in which it is desired to maintain a nearly constant level, i. e., between assigned upper and lower limits.

The valve 2a is connected to a float 40 by an appropriately mechanical arrangement. In the embodiment shown this arrangement includes a beam 41 pivoted at 42 and connected at one end by the rod 43 to the float 40. At the other end, the beam is connected by a link 44 to a lever 45 connected to the valve 2a. As in the embodiment of Fig. 4, the conduit 1a discharges onto an obturator 3b of the spherical dish type and the direct control of flow is effected by the piston 11, the cylinder 12 and the static pressure connection 6a. The liquid issuing past the obturator 3b discharges in to the basin 46, and its flow from the basin 46 is controlled by the valve 47. So long as this flow from basin 46 remains constant, the level in the basin holds the float 40 and thereby the valve 2a at their positions which cause the apparatus to give precisely the same discharge from conduit 1a. This discharge remains constant notwithstanding variations in the upstream head.

If a variation in level is produced in basin 46, because of, say the opening of the valve 47, the lowering of the float 40 causes valve 2a to open which increases the regulated discharge past the obturator 3b. The discharge will thus increase until there is a new balanced level established, different from the first, as a result of the travel of the float corresponding to the operation of valve 2a. This decrement may be made very small.

The arrangement of Fig. 10 has the further advantage of permitting a constant discharge with the same apparatus. For this it suffices to detach the mechanical connection between the float and the control valve and then set the valve in the desired position.

Whenever the total upstream head H varies, the discharge of the apparatus varies for an instant and then returns to the fixed value following a certain time delay characteristic or "rate of response." This rate of response is analogous to that of any system which is thrown out of its position of equilibrium. Other forces then come into play such as the inertia of the device and friction. Among these the friction of the connections between the piston and the cylinder and the friction with the guiding means are obviously harmful since they diminish the sensitivity of the apparatus. They should be reduced as much as possible.

On the other hand, hydraulic friction can have a favorable effect. For example, consider the effect of the loss of head in the pipe 6, which cannot alter the equilibrium because it does not exist when the piston is not moving. It has the effect of retarding the apparatus from following the rapid variations of head. This has the advantage of avoiding water hammer effects and improves the functioning stability of the device.

A regulating apparatus having a strictly constant discharge would not absorb or reduce any water hammer effect. On the other hand, a simple orifice, having a discharge which increases with the pressure drop across it, does reduce such effects. Apparatus constructed in accordance with the present invention reacts to a change in head with a momentary response like that of an orifice. This produces a temporary change in the discharge rate, but it is also effective to damp out oscillations in the rate of flow.

It will be understood that when it is desired to provide considerably more or less damping the main may be dimensioned accordingly. In accordance with the invention, the pressure connection to the piston-cylinder elements may even be equipped with an adjustable valve 8 (Fig. 1) which makes it possible at will to vary the rate of response. It may be observed that the adjustment of this valve has no influence on the discharge but only on the law of response. If desired this valve, or any other device producing a similar effect, may be so arranged as to have an automatic opening which varies with the flow.

It may be seen that in certain cases it would be of interest to have a regulation varying as a function of the head. According to the invention this can be done by giving to the piston a different cross sectional area than that of the jet. Thus, the discharge will increase with the head if $S>S'$, i. e., the jet being larger than the piston and, vice versa, the flow will decrease with the head if $S<S'$. The first case is interesting where we desire to avoid excessive pressure surges in the system. Indeed, if a high pressure surge does occur, the flow tends to increase and counteract the excess pressure surge.

It will be understood that the jet discharge need not necessarily be vertical, nor need it be facing downward. It suffices that the piston and jet produce opposite thrusts and that the auxiliary force acts in the same direction as the jet.

Figure 12:
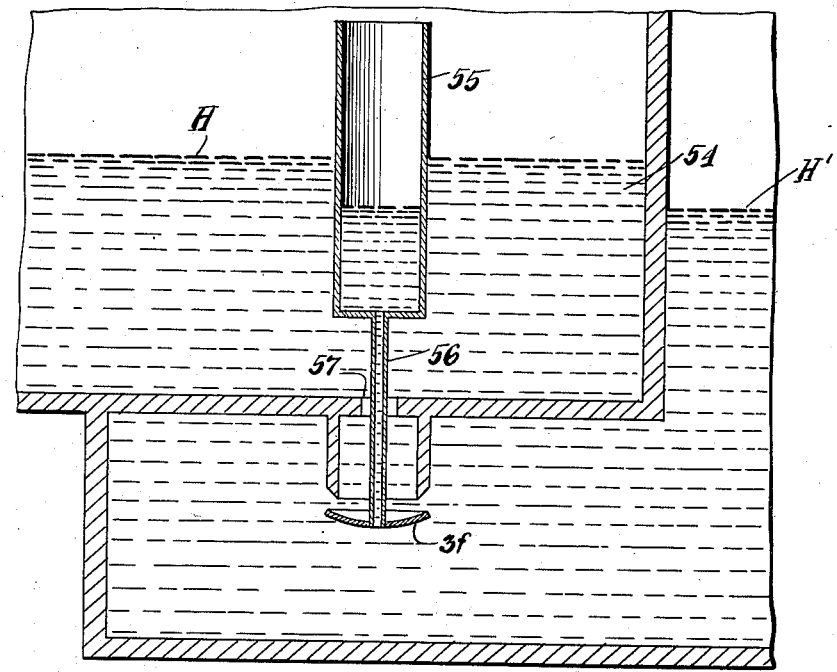

In Figs. 11 and 12 are shown further embodiments of the invention employing the float controlled type of obturator. These embodiments have for an object improvement in the stability of the device. They also provide means for controlling discharge independently of the liquid level at the downstream side of the obturator even when it is submerged.

In the device of Fig. 11 the stability of the mobile element is improved by lowering its center of gravity, as by means of an overload applied at or adjacent the obturator, and by raising the center of buoyancy, as by the addition to the main float of an auxiliary float and, preferably, by making the diameter of the auxiliary float greater than that of the main float and so associating the two that the auxiliary float remains completely submerged. For example, in Fig. 11 the weight 51 and the auxiliary float 52 increase the stability and the self-centering of the obturator 3f with respect to the restricted orifice 53 in the bottom of the liquid reservoir 54. As shown, auxiliary float 52 is positioned beneath and forms an extension of the main float 52a which is of smaller diameter than the auxiliary float.

In the device of Fig. 12 the float 55 is attached to the obturator 3f by means of a hollow rod 56, thus insuring communication between the interior of the float and the downstream level. The obturator 3f, as in Fig. 11, has the form of a shallow spherical dish. The obturators of Figs. 11 and 12 may be from 1.2 to 1.3 times the diameter of the jet, as in the case of Figs. 1, 6 and 7. The upstream level in the reservoir 54 is shown at H and the downstream level is shown at H', their difference being the total loss of head of the apparatus corresponding to the discharge through the restricted opening 57. The top of the float is open, thus insuring that the liquid level inside the float may rise to the full downstream liquid level.

The water enters the float by means of the hollow rod and stays there permanently at the same level as that downstream. The difference $H-H'$ is also equal to the head on the valve less the loss of head in the opening 57 and is proportional to the thrust on the float. Consequently, recalling the theory previously elaborated, it can be seen that a constant discharge is obtained.

It will be observed that, according to the invention as shown in Figs. 11 and 12, the regulating device is not guided. It has been found by experiment that an obturator in the form of a shallow spherical dish, as shown, centers itself evenly in the jet. It is to be understood that it is necessary to place the float in a wall, or a separate compartment, and not in the main stream.

It will also be understood that another type of obturator may be associated with the float means of either Fig. 11 or Fig. 12 in which case suitable guide means should be provided. It will also be apparent that it is possible to employ this device of the hollow rod combined with the general arrangement of the valve already described and shown in Fig. 11.

It may be remarked that a variation of the inside diameter of tube 56 affects both the rapidity of response and the stability of the apparatus. Another improvement in the stability of regulation may be accomplished by regulating the delivery either to a constant value (that is to say, without decrement) or to a value varying slightly with the head.

It is to be understood that the invention is capable of application in many ways other than as shown in the examples described in the preceding description, and that various changes may be made in the details of the construction, and particularly in the form of the obturator and the dispositions of the device in a fluid flow system, without departing from the invention as defined in the appended claims.

I claim:

1. Apparatus for regulating the flow of fluid comprising a closed conduit connected to a source of fluid and having an outlet, an obturating member located in the path of the fluid jet issuing from the outlet and movable toward and away from said outlet to vary the flow therethrough, said obturating member being subject to a biasing force acting in a flow increasing direction and to the thrust of the jet likewise acting in a flow increasing direction, a restriction in the conduit upstream from the outlet, a pressure sensitive element, means subjecting a surface of said element to a fluid under a pressure substantially equal to a pressure in the conduit upstream from said restriction, and means operatively connecting said pressure sensitive element and said obturating member and effective to transmit the force acting on said element due to said pressure to said obturating member in a flow decreasing direction.

2. Apparatus for regulating the flow of fluid as defined in claim 1, including means operable to vary the area of the restriction and thereby to vary the rate of flow.

3. Fluid flow regulating apparatus as defined in claim 2, in which said fluid is a liquid, and including a container receiving the discharge from said conduit outlet, and a float in said container operatively connected to said area varying means.

4. Apparatus for regulating the flow of fluid, comprising a closed conduit connected to a source of fluid and having an outlet, an obturating member located in the path of the fluid jet issuing from the outlet and movable toward and away from said outlet to vary the flow therethrough, said obturating member being subject to a biasing force acting in a flow increasing direction and to the thrust of the jet likewise acting in a flow increasing direction, said thrust having a characteristic variation with flow determined by the contour of said obturating member, a restriction in the conduit upstream from the outlet and effective to produce in said conduit a drop in pressure having a characteristic variation with flow determined by the cross-sectional area of the restriction and greater for any given increment of flow than said characteristic variation of the jet thrust for the same increment of flow, a pressure sensitive element, means subjecting a surface of said element to a fluid under a pressure substantially equal to a pressure in the conduit upstream from said restriction, and means operatively connecting said pressure sensitive element and said obturating member and effective to transmit the force acting on said element due to said pressure to said obturating member in a flow decreasing direction.

5. Fluid flow regulating apparatus as defined in claim 4, in which the effective area of said pressure sensitive element is substantially equal to the cross-sectional area of said outlet, so that said obturator is in equilibrium between opposing forces only when said flow is at a predetermined, substantially constant value.

6. Fluid flow regulating apparatus as defined in claim 4, in which said obturating member has a diameter from 1.2 to 1.3 times the diameter of the outlet and said pressure sensitive element is subject to a pressure substantially equal to the dynamic pressure in said conduit upstream from said restriction.

7. Fluid flow regulating apparatus as defined in claim 4, in which said obturating member has a diameter from 1.2 to 1.3 times the diameter of the outlet, and said pressure sensitive element is subject to a fluid pressure substantially equal to the static pressure upstream from said restriction, and said restriction has a cross-sectional area such that the ratio of the loss of static head across the restriction to the velocity head is greater than 1.

8. Fluid flow regulating apparatus as defined in claim 4, in which said obturating member has a diameter at least twice the diameter of the outlet, said pressure sensitive element is subject to a pressure substantially equal to the dynamic pressure in said conduit upstream of said restriction, and said restriction has a cross-sectional area such that the ratio of the loss of static head across the restriction to the velocity head is greater than 1.

9. Fluid flow regulating apparatus as defined in claim 4, in which said obturating member has a diameter at least twice the diameter of the outlet, said pressure sensitive element is subject to a fluid pressure substantially equal to the static pressure in said conduit upstream from said restriction, and said restriction has a cross-sectional area such that the ratio of the loss of static head across the restriction to the velocity head is greater than 2.

10. Fluid flow regulating apparatus as defined in claim 4, in which said obturating member has the form of a cylindrical cup with the open end of the cup facing said outlet, said member being substantially equal in diameter to said outlet, and said pressure sensitive element is subject to a pressure substantially equal to the dynamic pressure in the conduit upstream from the restriction.

11. Fluid flow regulating apparatus as defined in claim 4, in which said obturating member has the form of a cylindrical cup with the open end of the cup facing said outlet, said member being substantially equal in diameter to said outlet, said pressure sensitive element is subject to a fluid pressure substantially equal to the static pressure upstream from said restriction, and said restriction has a cross-sectional area such that the ratio of the loss of static head across the restriction to the velocity head is greater than 1.

12. Apparatus for regulating the flow of liquid, comprising a closed conduit connected to a source of fluid and having an outlet, an obturating member located in the path of the jet issuing from the outlet and movable toward and away from said outlet to vary the flow therethrough, said obturating member being subject to a biasing force acting in a flow increasing direction and to the thrust of the jet likewise acting in a flow increasing direction, said thrust having a characteristic variation with flow determined by the contour of said obturating member, a restriction in the conduit upstream from the outlet and effective to produce in said conduit a drop in pressure having a characteristic variation with flow determined by the cross-sectional area of the restriction and greater for any given increment of flow than said characteristic variation of the jet thrust for the same increment of flow, a float located in a body of liquid in fluid communication with the conduit upstream from said restriction, and means operatively connecting said float and said obturating member and effective to transmit the buoyant force acting on said float to said obturating member in a flow decreasing direction.

13. Apparatus for regulating the flow of liquid between two bodies of liquid at different levels, comprising a vertical conduit receiving liquid from the upper of said two bodies and discharging into the lower body, an obturating member located in the path of the fluid jet issuing from the outlet of said conduit and movable toward and away from said outlet to vary the flow therethrough, said obturating member being subject to a biasing force acting in a flow increasing direction and to the thrust of the jet likewise acting in a flow increasing direction, said thrust having a characteristic variation with flow determined by the contour of said obturating member, a restriction in the conduit upstream from the outlet and effective to produce in said conduit a drop in pressure having a characteristic variation with flow determined by the cross-sectional area of the restriction and greater for any given increment of flow than said characteristic variation of the jet thrust for the same increment of flow, a hollow float located in the upper body of liquid and extending above the surface thereof, and a hollow stem extending through said conduit and connecting the float to the obturator, said stem providing fluid communication between the interior of said float and said lower body of liquid.

14. Apparatus for regulating the flow of fluid in a main conduit supplying two branch conduits, comprising an obturating member located in the path of the fluid jet issuing from the outlet of one of said branch conduits and movable toward and away from said outlet to vary the flow therethrough, said obturating member being subject to a biasing force acting in a flow increasing direction and to the thrust of the jet likewise acting in a flow increasing direction, said thrust having a characteristic variation with flow determined by the contour of said obturating member, a restriction in the main conduit upstream from the junction of the branch conduits and effective to produce in said main conduit a drop in pressure having a characteristic variation with flow determined by the cross-sectional area of the restriction and greater for any given increment of flow than said characteristic variation of the jet thrust for the same increment of flow, a pressure sensitive element having a surface substantially equal in area to the cross-sectional area of said outlet, means subjecting said surface to a fluid under a pressure substantially equal to a pressure in the main conduit upstream from said restriction, and means operatively connecting said pressure sensitive element and said obturating member and effective to transmit the force acting on said element due to said pressure to said obturating member in a flow decreasing direction, said obturator being effective to vary the flow through said outlet to maintain a constant pressure drop across said restriction and thereby a constant flow in said main conduit.

15. Fluid flow regulating apparatus as defined in claim 14, including a variable restriction in the other of said branch conduits, said variable restriction being operable to vary the distribution of flow between said branch conduits without affecting the total flow in the main conduit.

16. Apparatus for regulating the flow of fluid, comprising a closed straight conduit connected to a source of fluid and having an outlet, an obturating member located in the path of the fluid jet issuing from the outlet and movable toward and away from said outlet to vary the flow therethrough, said obturating member being subject to a biasing force acting in a flow increasing direction and to the thrust of the jet likewise acting in a flow increasing direction, said thrust having a characteristic variation with flow determined by the contour of said obturating member, a restriction in the conduit upstream from the outlet and effective to produce in said conduit a drop in pressure having a characteristic variation with flow determined by the cross-sectional area of the restriction and greater for any given increment of flow than said characteristic variation of the jet thrust from the same increment of flow, a cylinder spaced from said outlet and obturating member, and a piston slidably mounted in said cylinder and attached to said obturating member, said cylinder being in fluid communication with said conduit upstream from said restriction.

17. Apparatus for regulating the flow of liquid as defined in claim 12 in which said conduit includes an elbow, and said float and the associated body of liquid are located outside of said conduit.

YVES PONSAR.

References Cited in the file of this patent

UNITED STATES PATENTS

| Number | Name | Date |
|---|---|---|
| 648,180 | Stumpf | Apr. 24, 1900 |
| 785,224 | Lowry | Mar. 21, 1905 |
| 883,383 | Borden | Mar. 31, 1908 |
| 2,172,865 | Danel | Sept. 12, 1939 |
| 2,223,712 | Ziebolz | Dec. 3, 1940 |